(12) United States Patent
Koch et al.

(10) Patent No.: US 11,304,363 B2
(45) Date of Patent: Apr. 19, 2022

(54) SEED FIRMER FOR PASSIVE SEED ORIENTATION WITHIN AGRICULTURAL FIELDS

(71) Applicant: PRECISION PLANTING LLC, Tremont, IL (US)

(72) Inventors: Dale Koch, Tremont, IL (US); Jeremy Hodel, Morton, IL (US); Todd Swanson, Morton, IL (US); Ian Radtke, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 597 days.

(21) Appl. No.: 16/316,599

(22) PCT Filed: Jul. 13, 2017

(86) PCT No.: PCT/US2017/042009
§ 371 (c)(1),
(2) Date: Jan. 9, 2019

(87) PCT Pub. No.: WO2018/013860
PCT Pub. Date: Jan. 18, 2018

(65) Prior Publication Data
US 2019/0289779 A1  Sep. 26, 2019

Related U.S. Application Data

(60) Provisional application No. 62/362,459, filed on Jul. 14, 2016.

(51) Int. Cl.
*A01C 5/06* (2006.01)
*A01C 7/20* (2006.01)
(Continued)

(52) U.S. Cl.
CPC ............ *A01C 21/005* (2013.01); *A01C 5/068* (2013.01); *A01C 7/10* (2013.01); *A01C 7/20* (2013.01)

(58) Field of Classification Search
CPC .................................. A01C 5/068; A01C 7/20
See application file for complete search history.

(56) References Cited

U.S. PATENT DOCUMENTS 221,004 A * 10/1879 Strayer ................... A01C 5/06
111/190
258,928 A * 6/1882 Keith ...................... A01C 7/06
111/186
(Continued)

FOREIGN PATENT DOCUMENTS

CN    2092195    1/1992
CN    2096865    2/1992
(Continued)

OTHER PUBLICATIONS

Koller et al., "Modelling and validation of maize seed orientation by pushing", Mar. 12, 2016, Science Direct, pp. 338-349.
(Continued)

*Primary Examiner* — Alicia Torres

(57) ABSTRACT

Systems, implements, and methods for seed orientation during planting operations of agricultural plants of agricultural fields include a seed firmer having a base support to be positioned in operation in proximity to a trench for planting seed in the trench and a lower member integrated with the base support or coupled to the base support. The lower member includes a non-planar ground contacting lower surface to adjust an orientation of the seed to a desired seed orientation within the trench and to position the seed within the trench at a desired depth.

6 Claims, 7 Drawing Sheets

(51) Int. Cl.
  *A01C 21/00* (2006.01)
  *A01C 7/10* (2006.01)

(56) References Cited

U.S. PATENT DOCUMENTS

| | | | |
|---|---|---|---|
| 3,308,775 A * | 3/1967 | Klene | A01C 5/062 |
| | | | 111/153 |
| 3,841,522 A | 10/1974 | Hatcher | |
| 4,321,972 A | 3/1982 | Robertson et al. | |
| 5,425,318 A | 6/1995 | Keeton | |
| 5,640,915 A * | 6/1997 | Schaffert | A01C 5/068 |
| | | | 111/150 |
| 5,673,638 A * | 10/1997 | Keeton | A01C 5/068 |
| | | | 111/167 |
| 5,918,557 A * | 7/1999 | Schaffert | A01C 5/062 |
| | | | 111/150 |
| 6,178,901 B1 * | 1/2001 | Anderson | A01C 7/20 |
| | | | 111/197 |
| 6,564,730 B2 | 5/2003 | Crabb et al. | |
| 6,666,156 B1 * | 12/2003 | Mayerle | A01C 5/068 |
| | | | 111/150 |
| 7,685,951 B2 * | 3/2010 | Beaujot | A01C 5/062 |
| | | | 111/153 |
| 7,699,009 B2 | 4/2010 | Sauder et al. | |
| 8,862,339 B2 | 10/2014 | Henry et al. | |
| 8,985,037 B2 | 3/2015 | Radtke et al. | |
| 9,402,341 B1 | 8/2016 | Wipf | |
| 2007/0266917 A1 | 11/2007 | Riewarts et al. | |
| 2010/0107944 A1 | 5/2010 | Snipes et al. | |
| 2012/0312209 A1 | 12/2012 | Schaffert | |
| 2013/0192504 A1 | 8/2013 | Sauder | |
| 2014/0048002 A1 * | 2/2014 | Grimm | A01C 21/00 |
| | | | 111/127 |
| 2014/0379228 A1 | 12/2014 | Batcheller et al. | |
| 2015/0250094 A1 | 9/2015 | Hodel et al. | |
| 2015/0321353 A1 | 11/2015 | McCarty, II et al. | |
| 2015/0334913 A1 | 11/2015 | Gentili | |
| 2016/0037709 A1 | 2/2016 | Sauder et al. | |

FOREIGN PATENT DOCUMENTS

| | | |
|---|---|---|
| CN | 1500374 | 6/2004 |
| CN | 1810073 | 8/2006 |
| CN | 201623980 | 11/2010 |
| CN | 102893723 A | 1/2013 |
| CN | 102918959 | 2/2013 |
| CN | 103069953 | 5/2013 |
| CN | 103609227 | 3/2014 |
| CN | 203467181 | 3/2014 |
| CN | 104488418 | 4/2015 |
| CN | 104521380 | 4/2015 |
| CN | 204244685 | 4/2015 |
| CN | 204362559 | 6/2015 |
| CN | 204377396 | 6/2015 |
| CN | 105103738 | 12/2015 |
| CN | 105165193 | 12/2015 |
| CN | 105393682 | 3/2016 |
| CN | 106612787 | 5/2017 |
| DE | 19921105 | 1/2000 |
| EP | 3172954 | 5/2017 |
| JP | H0998607 | 4/1997 |
| RU | 133678 | 10/2013 |
| WO | 2007065436 | 6/2007 |
| WO | 2012089031 | 7/2012 |
| WO | 2015160827 A1 | 10/2015 |
| WO | 2015171908 A1 | 11/2015 |
| WO | 2015171915 A1 | 11/2015 |
| WO | 2016077651 A1 | 5/2016 |
| WO | 2018013858 A1 | 1/2018 |
| WO | 2018013860 | 1/2018 |
| WO | 2018013861 | 1/2018 |

OTHER PUBLICATIONS

Koller et al., "Angular Seed Orientation Tolerances for a Precision Corn Planter", Biosystems Agricultural & Engineering, ASABE Annual Meeting, Jul. 2012, 15 pages.
International Preliminary Report from PCT Application No. PCT/US2017/042010, dated Jan. 24, 2019, 6 pages.
International Preliminary Report from PCT Application No. PCT/US2017/042009, dated Dec. 30, 2018, 7 pages.
International Preliminary Report from PCT Application No. PCT/US2017/042008, dated Jan. 24, 2019, 6 pages.
International Preliminary Report from PCT Application No. PCT/US2017/042006, dated Dec. 30, 2018, 8 pages.
International Search Report and Written Opinion for PCT Application No. PCT/US2017/042009, 11 pages, dated Jan. 8, 2018.
International Search Report and Written Opinion for PCT Application No. PCT/US2017/042010, 11 pages, dated Sep. 29, 2017.
International Search Report and Written Opinion for PCT Application No. PCT/US2017/042008, 10 pages, dated Aug. 27, 2017.
International Search Report and Written Opinion for PCT Application No. PCT/US2017/042006, 8 pages, dated Sep. 13, 2017.
CN Publication for Application No. CN201780056435.X, 20 pages, May 5, 2019.
CN Publication for Application No. CN201780056436.4, 20 pages, May 8, 2019.
CN Publication for Application No. CN201780056438.3, 25 pages, May 5, 2019.
CN Publication for Application No. CN201780056437.9, 23 pages, May 5, 2019.

* cited by examiner

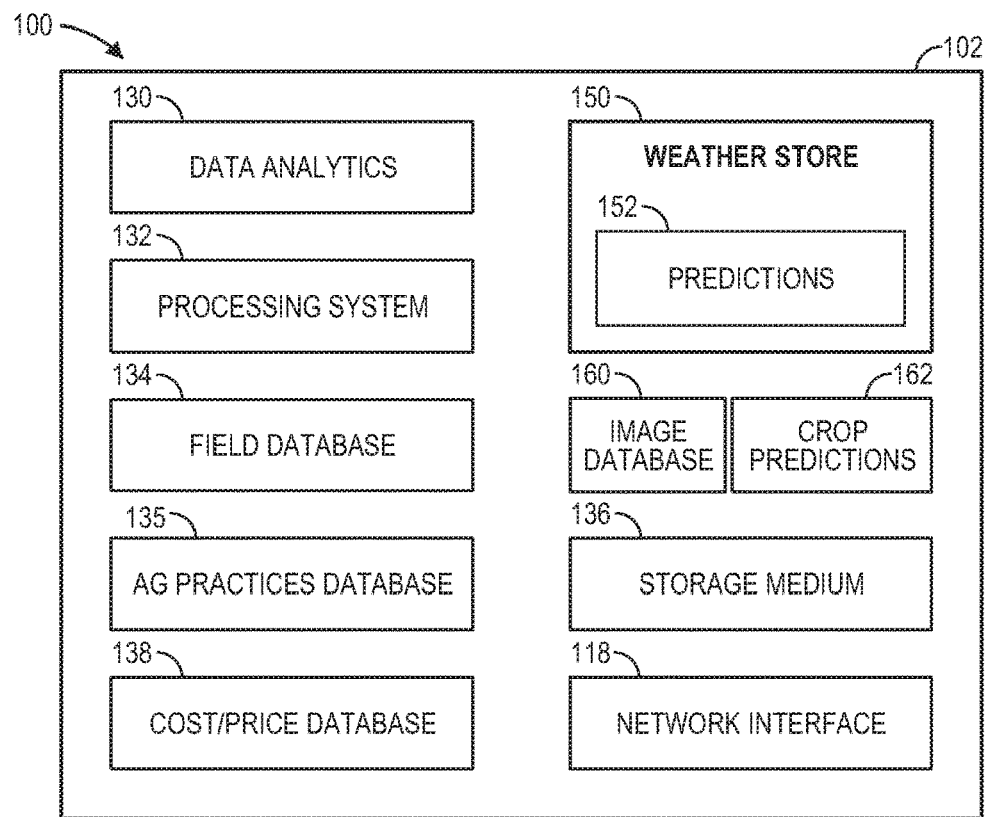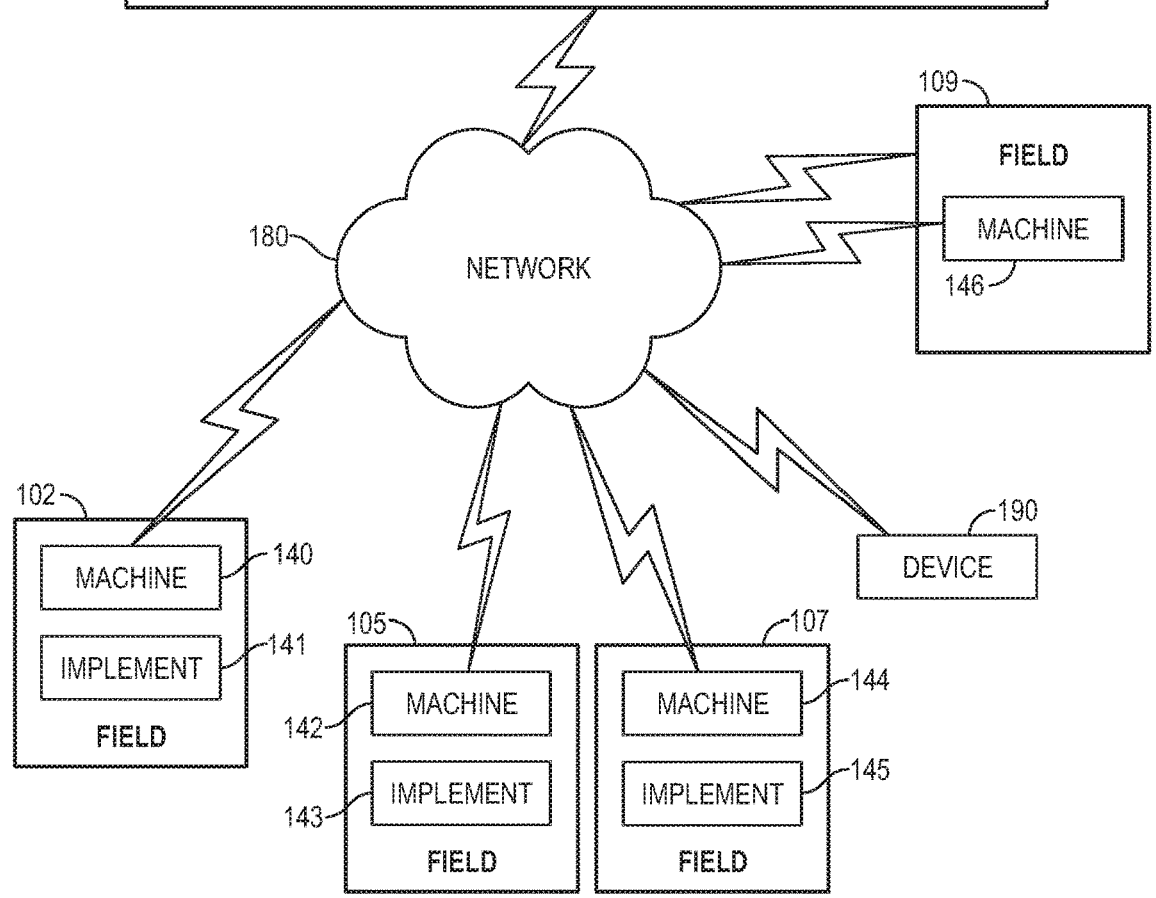
FIG. 1

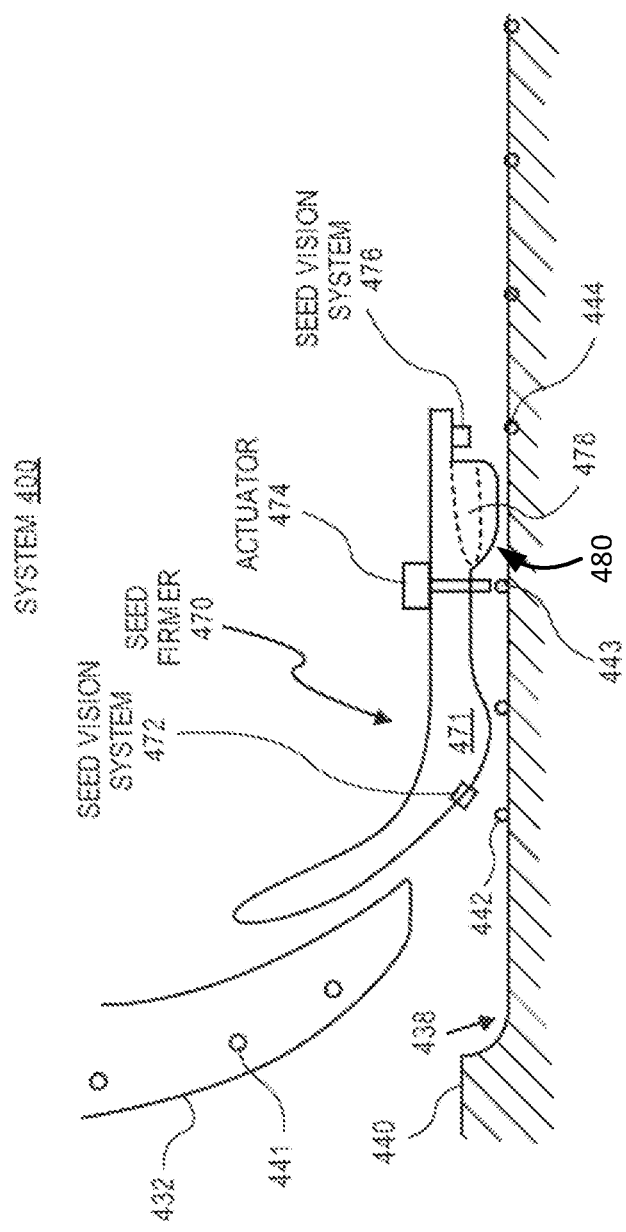
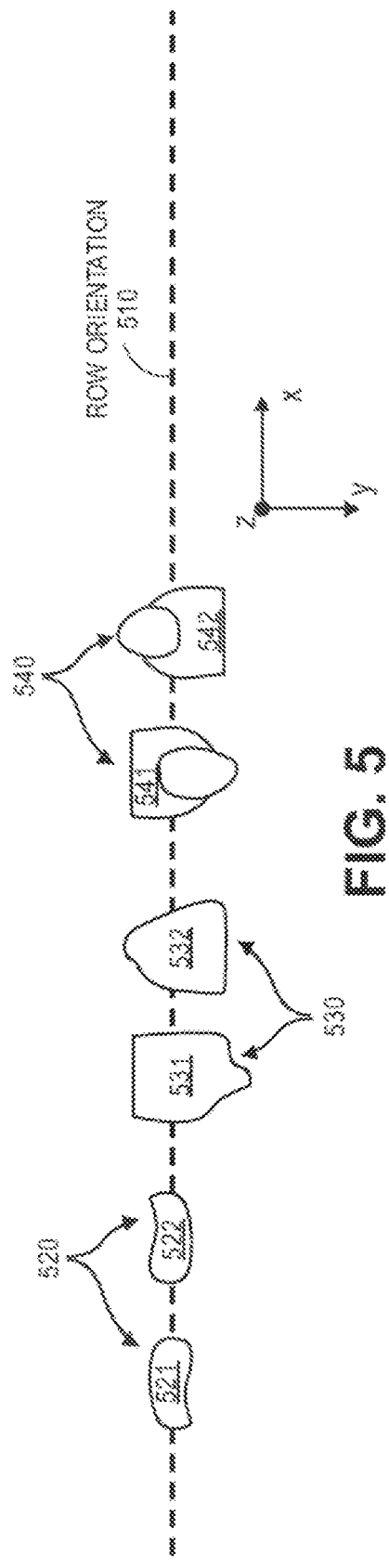

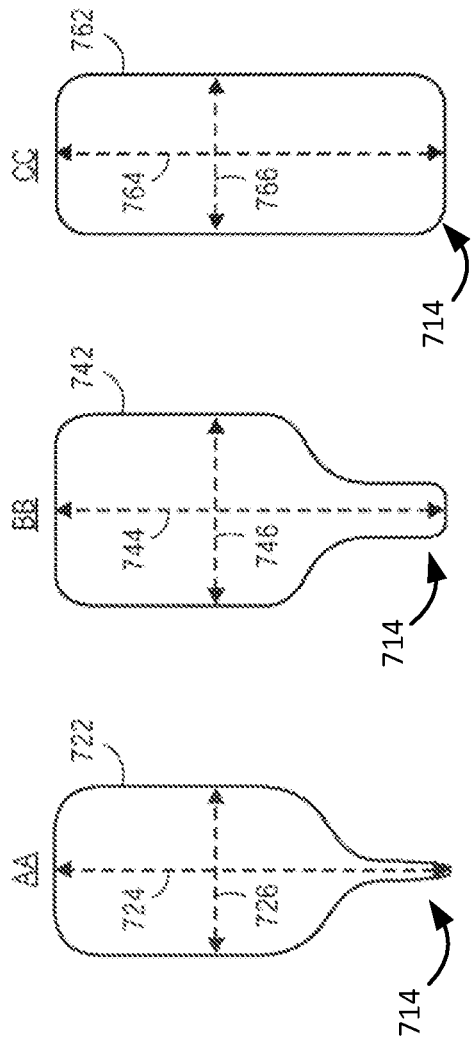
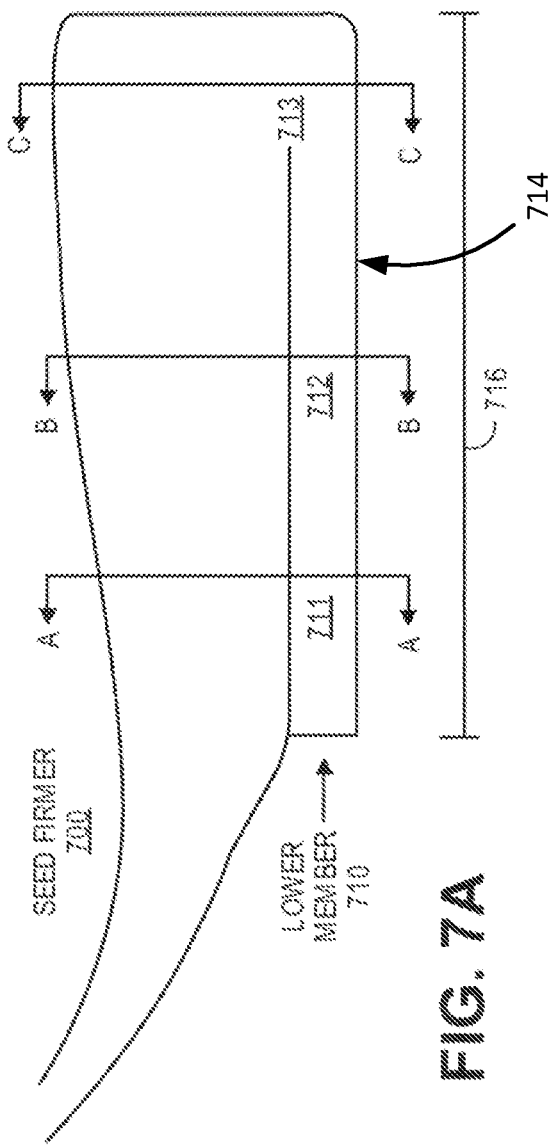
FIG. 7B  FIG. 7C  FIG. 7D
FIG. 7A

SEED FIRMER FOR PASSIVE SEED ORIENTATION WITHIN AGRICULTURAL FIELDS

RELATED APPLICATIONS

This application claims priority under 35 U.S.C. § 371 to International Application No. PCT/US17/042009 filed Jul. 13, 2017, entitled SYSTEMS, IMPLEMENTS, AND METHODS FOR PASSIVE SEED ORIENTATION WITHIN AGRICULTURAL FIELDS which claims the benefit of U.S. Provisional Application No. 62/362,459, filed on Jul. 14, 2016 entitled: SYSTEMS, IMPLEMENTS, AND METHODS FOR PASSIVE SEED ORIENTATION WITHIN AGRICULTURAL FIELDS.

TECHNICAL FIELD

Embodiments of the present disclosure relate to systems, implements, and methods for passive seed orientation within seed furrows or trenches of agricultural fields.

BACKGROUND

Planters are used for planting seeds of crops (e.g., corn, soybeans) in a field. Seeds need to be planted with consistent spacing and with a high speed to decrease planting time. However, the seeds are delivered within a furrow or trench in a non-uniform manner and this can negatively affect growth conditions of the crops.

BRIEF DESCRIPTION OF THE DRAWINGS

The present disclosure is illustrated by way of example, and not by way of limitation, in the figures of the accompanying drawings and in which:

FIG. 1 shows an example of a system for performing agricultural operations (e.g., planting operations) of agricultural fields including operations of an implement having row units in accordance with one embodiment.

FIG. 4 illustrates a side view of a system 400 for precise seed orientation within a trench during planting of agricultural plants (e.g., corn plants, soy bean plants, etc.) in accordance with one embodiment.

FIG. 5 illustrates a top view 500 of preferred orientations of seeds during planting in a trench or furrow.

FIG. 7A illustrates a side view of a seed firmer having a lower member with a non-planar design for orienting seed in a desired or preferred orientation in accordance with one embodiment.

FIG. 7B illustrates a cross-sectional view AA of a first region 711 of a lower member 710 of a seed firmer in accordance with one embodiment.

FIG. 7C illustrates a cross-sectional view BB of a second region 712 of the lower member 710 in accordance with one embodiment.

FIG. 7D illustrates a cross-sectional view CC of a third region 713 of the lower member 710 in accordance with one embodiment.

SUMMARY

Figure 2:
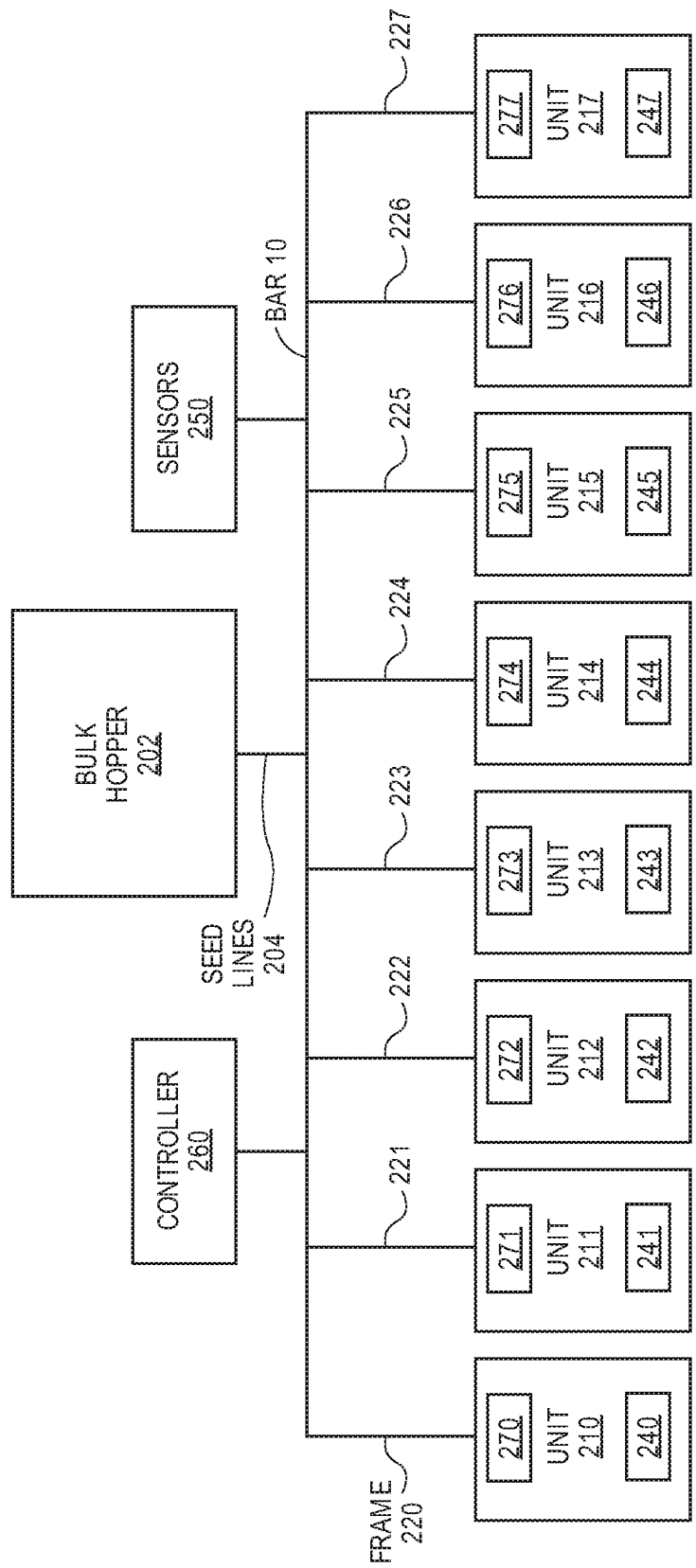
FIG. 2 illustrates an architecture of an implement 200 for planting operations in trenches of agricultural fields in accordance with one embodiment.

Described herein are systems, implements, and methods for seed orientation during planting operations of agricultural plants of agricultural fields.

In one embodiment, a seed firmer includes a base support to be positioned in operation in proximity to a trench for planting seed in the trench and a lower member integrated with the base support or coupled to the base support. The lower member includes a non-planar ground contacting lower surface to adjust an orientation of the seed to a desired seed orientation within the trench and to position the seed within the trench at a desired depth.

DETAILED DESCRIPTION

Described herein are systems, implements, and methods for seed orientation during planting operations of agricultural plants of agricultural fields.

In one embodiment, a seed firmer includes a base support to be positioned in operation in proximity to a trench for planting seed in the trench and a lower member integrated with the base support or coupled to the base support. The lower member includes a non-planar ground contacting lower surface to adjust an orientation of the seed to a desired seed orientation within the trench and to position the seed within the trench at a desired depth.

The adjustment may optionally be based on sensed data that is sensed during a training period. In one example, seed orientation data is obtained during an initial region of planting operations in a field for a training period. This seed orientation data for the initial region is then used to adjust the seed orientation to optimize seed orientation for subsequent regions of the field. A desired and uniform seed orientation for seed in a furrow or trench causes faster uniform emergence of plants from the soil, approximately uniform growth and height of the plants, approximately uniform consumption of water and nutrients of the plants, and approximately uniform collection of sunlight for each plant. The uniform emergence of plants improves growth conditions due to less shading from adjacent plants and leaves and more sunlight per leaf of the plant. A desired range of leaf orientations can also allow the leaves to be more visible from above and thus improve conditions for application of foliar treatment of fertilizer or pesticide. The desired range of leaf orientations can also shade weeds to a greater extent to reduce weed growth.

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

FIG. 1 shows an example of a system for performing agricultural operations (e.g., planting operations) of agricultural fields including operations of an implement having row units in accordance with one embodiment. For example and in one embodiment, the system 100 may be implemented as a cloud based system with servers, data processing devices, computers, etc. Aspects, features, and functionality of the system 100 can be implemented in servers, planters, planter monitors, combines, laptops, tablets, computer terminals, client devices, user devices (e.g., device 190), handheld computers, personal digital assistants, cellular telephones, cameras, smart phones, mobile phones, computing devices, or a combination of any of these or other data processing devices.

In other embodiments, the system includes a network computer or an embedded processing device within another device (e.g., display device) or within a machine (e.g., planter, combine), or other types of data processing systems having fewer components or perhaps more components than that shown in FIG. 1. The system 100 (e.g., cloud based system) and agricultural operations can control and monitor seed orientation within a planting furrow or trench during planting using an implement or machine. The system 100 includes machines 140, 142, 144, 146 and implements 141, 143, 145 coupled to a respective machine. The implements (or machines) can include row units for planting operations of crops within associated fields (e.g., fields 102, 105, 107, 109). The system 100 includes an agricultural analysis system 102 that includes a weather store 150 with current and historical weather data, weather predictions module 152 with weather predictions for different regions, and at least one processing system 132 for executing instructions for controlling and monitoring different operations (e.g., planting, fertilizing). The storage medium 136 may store instructions, software, software programs, etc for execution by the processing system and for performing operations of the agricultural analysis system 102. In one example, storage medium 136 may contain a planting prescription (e.g., planting prescription that relates georeferenced positions in the field to planting parameters (e.g., soil type, downforce, speed, seed orientation, etc.). The implement 141 (or any of the implements) may include an implement 200 whose sensors and/or controllers may be specifically the elements that are in communication with the network 180 for sending control signals or receiving as-applied data.

An image database 160 stores captured images of crops at different growth stages. A data analytics module 130 may perform analytics on agricultural data (e.g., images, weather, field, yield, etc.) to generate crop predictions 162 relating to agricultural operations.

A field information database 134 stores agricultural data (e.g., crop growth stage, soil types, soil characteristics, moisture holding capacity, etc.) for the fields that are being monitored by the system 100. An agricultural practices information database 135 stores farm practices information (e.g., as-applied planting information, as-applied spraying information, as-applied fertilization information, planting population, applied nutrients (e.g., nitrogen), yield levels, proprietary indices (e.g., ratio of seed population to a soil parameter), etc.) for the fields that are being monitored by the system 100. An implement can obtain seed orientation data and provide this data to the system 100. A cost/price database 138 stores input cost information (e.g., cost of seed, cost of nutrients (e.g., nitrogen)) and commodity price information (e.g., revenue from crop). The system 100 shown in FIG. 1 may include a network interface 118 for communicating with other systems or devices such as drone devices, user devices, and machines (e.g., planters, combines) via a network 180 (e.g., Internet, wide area network, WiMax, satellite, cellular, IP network, etc.). The network interface include one or more types of transceivers for communicating via the network 180.

The processing system 132 may include one or more microprocessors, processors, a system on a chip (integrated circuit), or one or more microcontrollers. The processing system includes processing logic for executing software instructions of one or more programs. The system 100 includes the storage medium 136 for storing data and programs for execution by the processing system. The storage medium 136 can store, for example, software components such as a software application for controlling and monitoring planting operations or any other software application. The storage medium 136 can be any known form of a machine readable non-transitory storage medium, such as semiconductor memory (e.g., flash; SRAM; DRAM; etc.) or non-volatile memory, such as hard disks or solid-state drive.

While the storage medium (e.g., machine-accessible non-transitory medium) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

FIG. 2 illustrates an architecture of an implement 200 for planting operations in trenches of agricultural fields in accordance with one embodiment. The implement 200 (e.g., planter, cultivator, plough, etc.) includes at least one bulk hopper 202 with each bulk hopper containing a seed variety (e.g., a seed variety or a soybean variety). Each bulk hopper is preferably in fluid communication with an individual seed entrainer (not shown). Each seed entrainer is preferably mounted to a lower outlet of the associated bulk hopper 202. Each seed entrainer is preferably in fluid communication with a pneumatic pressure source and configured to convey air-entrained seeds through a plurality of seed lines 204 to the row units 210-217. A controller 260 (e.g., drive controller) is preferably configured to generate a drive command signal corresponding to a desired rate of seed disc rotation for seed meters of the row units. The drive controller 260 is preferably in data communication with a planter monitor of a machine. The implement also includes sensors 250 (e.g., speed sensors, seed sensors for detecting passage of seed, downforce sensors, actuator valves, speed sensors for the machine, seed force sensors for a planter, vacuum, lift, lower sensors for an implement, etc.) for controlling and monitoring operations of the implement. The sensors can be utilized on the implement 200 either row-by-row of row units or upstream of where the seed lines branches out to the row units as illustrated in FIG. 2.

The row units are mechanically coupled to the frames 220-227 which are mechanically coupled to a bar 10. Each row unit can include sensors and components having a seed orientation mechanism (e.g., lower member of firmer having non-planar lower surface, ridged or grooved lower surface of lower member, geometrical shape on lower surface of lower member) for obtaining a proper seed orientation and/or positioning of seed during planting in a trench or furrow in an agricultural field. Each row unit may include a respective seed firmer 240-247 for positioning the seed within the trench at a certain depth and also includes a seed orientation functionality to change an orientation of the seed if desired. Each seed firmer can include an optional first seed vision system (e.g., machine vision, lidar (light detection and ranging)) to determine pre-orientation of the seed after placement in the trench with a seed tube, a lower surface of the firmer having a non-planar design (e.g., ridges, grooves, or a geometrical shape(s)) that is designed to change an orientation of the seed (e.g., large seed orientation, small seed orientation), and an optional second seed vision system (e.g., machine vision, lidar (light detection and ranging)) to determine a post-orientation of the seed after the seed is positioned and potentially oriented with the seed firmer to confirm that the seed has been oriented with a desired orientation or range of orientations. The row units can include any of the embodiments described herein in conjunction with FIGS. 2-4.

In an alternative embodiment, a seed orientation mechanism (e.g., member having non-planar lower surface, ridged or grooved lower surface of member, geometrical shape on lower surface of member)) is located in a separate seed orientation component 270-277 that is separate from the seed firmer. The first and second vision systems may also be integrated with the seed orientation component.

Figure 3:
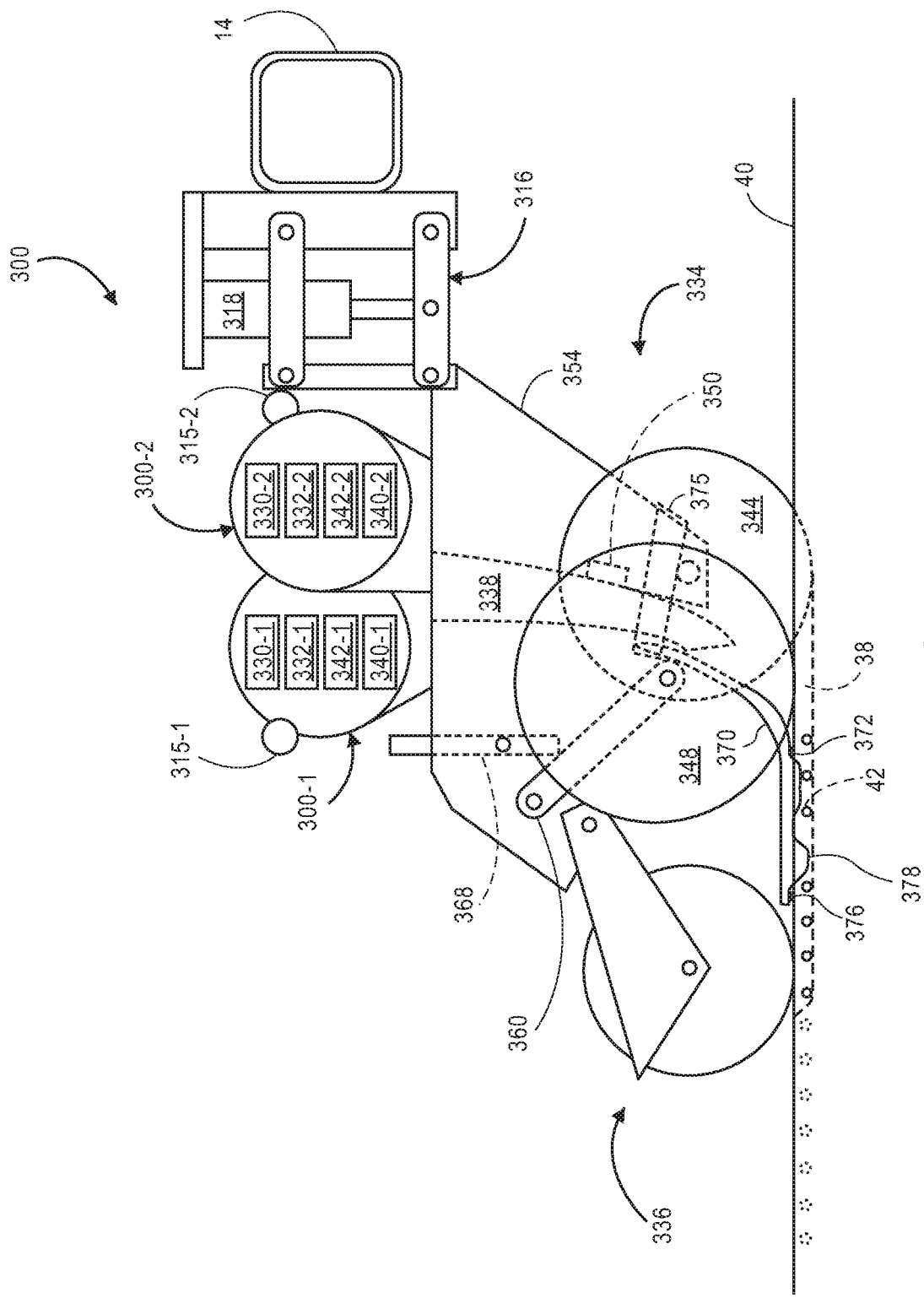
FIG. 3 illustrates an embodiment in which the row unit 300 is a planter row unit having seed orientation functionality during planting in accordance with one embodiment.

FIG. 3 illustrates an embodiment in which the row unit 300 is a planter row unit having seed orientation functionality during planting in accordance with one embodiment. The row unit 300 is preferably pivotally connected to the toolbar 14 (e.g., bar 10 of FIG. 2) by a parallel linkage 316. An actuator 318 is preferably disposed to apply lift and/or down force on the row unit 300. An opening system 334 preferably includes two opening discs 344 rollingly mounted to a downwardly-extending shank 354 and disposed to open a v-shaped trench 38 or furrow in the soil 40. A pair of gauge wheels 348 is pivotally supported by a pair of corresponding gauge wheel arms 360. The height of the gauge wheels 348 relative to the opener discs 344 sets the depth of the trench 38. A depth adjustment rocker 368 limits the upward travel of the gauge wheel arms 360 and thus the upward travel of the gauge wheels 348. A down force sensor (not shown) is preferably configured to generate a signal related to the amount of force imposed by the gauge wheels 348 on the soil 40; in some embodiments the down force sensor comprises an instrumented pin about which the rocker 368 is pivotally coupled to the row unit 300.

Continuing to refer to FIG. 3, a first seed meter 300-1, is preferably mounted to the row unit 300 and disposed to deposit seeds 42 into the trench 38, e.g., through a seed tube 338 disposed to guide the seeds toward the trench. In other embodiments, the seed tube 338 is replaced with a seed conveyor or belt. An optional second seed meter 300-2 is preferably mounted to the row unit 300 and disposed to deposit seeds 42 into the same trench 38, e.g., through the same seed tube 338. Each of the seed meters 300-1, 300-2 preferably includes a seed side housing 330-1, 330-2 having an auxiliary hopper 332-1, 332-2 for storing seeds 42 to be deposited by the meter. Each of the seed meters 300-1, 300-2 preferably includes a vacuum side housing 340-1, 340-2 including a vacuum port 342-1, 342-2 pulling a vacuum within the vacuum side housing. Each of the seed meters 300-1, 300-2 preferably includes a seed disc that includes seed apertures (not shown). The seed disc preferably separates interior volumes of the vacuum side housing and the seed side housing. In operation, seeds 42 communicated from the auxiliary hopper 332-1, 332-2 into the seed side housing 330-1, 330-2 are captured on the seed apertures due to the vacuum in the vacuum side housing and then released into the seed tube 338. Each of the meters is preferably powered by individual electric drives 315-1, 315-2 respectively. Each drive is preferably configured to drive a seed disc within the associated seed meter. In other embodiments, the drive 315 may comprise a hydraulic drive or other motor configured to drive the seed disc.

A seed sensor 350 (e.g., an optical or electromagnetic seed sensor configured to generate a signal indicating passage of a seed) is preferably mounted to the seed tube 338 and disposed to send light or electromagnetic waves across the path of seeds 42. A closing system 336 including one or more closing wheels is pivotally coupled to the row unit 300 and configured to close the trench 38.

In one example, a seed firmer 370 is coupled to a component (e.g., shank 354) of the row unit 300 with a bracket 375. The seed firmer is preferably designed to resiliently engage the bottom of the trench 38 in order to press seeds 42 into the soil before the trench is closed. The seed firmer 370 also includes a seed orientation functionality to change an orientation of the seed if desired or necessary. The seed firmer 370 includes an optional seed vision system 372 (e.g., machine vision, lidar (light detection and ranging)) to determine pre-orientation of the seed after placement in the trench with the seed tube, a lower member 378 of the firmer having a lower ground contacting surface with a non-planar design (e.g., ridges, grooves, or geometrical shape(s)) that is designed to change an orientation of the seed (e.g., large seed orientation, small seed orientation), and an optional seed vision system 376 (e.g., machine vision, lidar (light detection and ranging)) to determine a post-orientation of the seed after the seed is positioned and oriented with the seed firmer. The post-orientation data of the seed vision system 376 is used to confirm if the seed has a desired seed orientation. The lower member 378 is designed to orient the seed in the trench in desired or preferred orientations (e.g., 520, 530, 540) or range of orientations that produce plants with leaves that are not parallel with a direction of a row of plants.

FIG. 4 illustrates a side view of a system 400 for precise seed orientation within a trench during planting of agricultural plants (e.g., corn plants, soy bean plants, etc.) in accordance with one embodiment. In one example, the system 400 is included with a row unit (e.g., row units 210-217, row unit 300). The system 400 includes a seed tube 432 for providing seed (e.g., seed 441) to a trench or furrow 438 within a ground surface 440.

A seed firmer 470 (e.g., seed firmer with seed orientation functionality) includes a base support 471 that is coupled to a component (e.g., shank 354) of a row unit. The seed firmer 470 positions the seed within the trench at a certain depth into the soil to provide a proper seed to soil contact for optimal growth conditions and also includes a seed orientation functionality to change an orientation of the seed if desired or necessary for desired seed orientation. The seed firmer 470 includes an optional seed vision system 472 to determine pre-orientation of the seed after placement in the trench with the seed tube 432. The seed vision system 472 determines pre-orientation data of the seed 442 in a pre-orientation position associated with the seed 442. A lower member 478 of the firmer includes a lower surface 480 having a non-planar design (e.g., ridges, grooves, or a geometrical shape(s)) that is designed to change an orientation of the seed (e.g., large seed orientation, small seed orientation) to a desired or preferred orientation. In one example, the orientation is changed to at least one of the preferred orientations 520, 530, or 540 (e.g., orientation 520, a combination of orientations 530 and 540) as illustrated in FIG. 5 to have a uniform seed orientation for seed in a furrow or trench. This causes faster uniform emergence from the soil, approximately uniform growth and height of the plants, approximately uniform consumption of water and nutrients for the plants, uniform collection of sunlight for each plant, and improves growth and orientation of leaves of the agricultural plants that have been planted. In another example, the orientation causes plants to have leaves that are not parallel with a direction of a row. An optional seed vision system 476 determines post-orientation data of the seed in a post-orientation position that is associated with seed 444 after the seed is positioned and oriented with the actuator 474. The post-orientation data can be used to confirm whether the seed was properly oriented in the trench.

FIG. 5 illustrates a top view 500 of desired or preferred orientations of seeds during planting in a trench or furrow. Rows of corn plants have a row orientation 510 in a field. Seed 521 and 522 have a first orientation 520 in which tips of the seed are positioned in a downward direction (z axis) into the ground and embryos are positioned in a direction (y axis) that is transverse with respect to a direction (x axis) of the row orientation 510. Seed 531 and 532 have a second orientation 530 in which tips of the seed are positioned in a direction (y axis) that is transverse with respect to a direction (x axis) of the row orientation 510 and embryos face downwards into the ground. Seed 541 and 542 have a third orientation 540 in which tips of the seed are positioned in a direction (y axis) that is transverse with respect to a direction (x axis) of the row orientation 510 and embryos face upwards away from the ground. These seed orientations 520, 530, and 540 are designed to produce leaves of the corn plants having a longitudinal axis in a direction (y axis) that is substantially transverse with respect to a direction (x axis) of row orientation 510 or at least having a longitudinal axis of leaf orientations that are not parallel with respect to a direction of the row orientation 510. In this manner, leaves will have more sun exposure and less shading from other leaves or adjacent plants in a row. In one example, a desired leaf orientation or range of leaf orientations is any orientation that is not parallel or substantially parallel with a direction (x-axis) of row orientation 510. In another example, a desired leaf orientation or range of leaf orientations is any orientation that is substantially perpendicular with a direction (x-axis) of row orientation 510 within a certain angular rotation (e.g., +/−45 degrees from being perpendicular to the x-axis).

Figure 6:
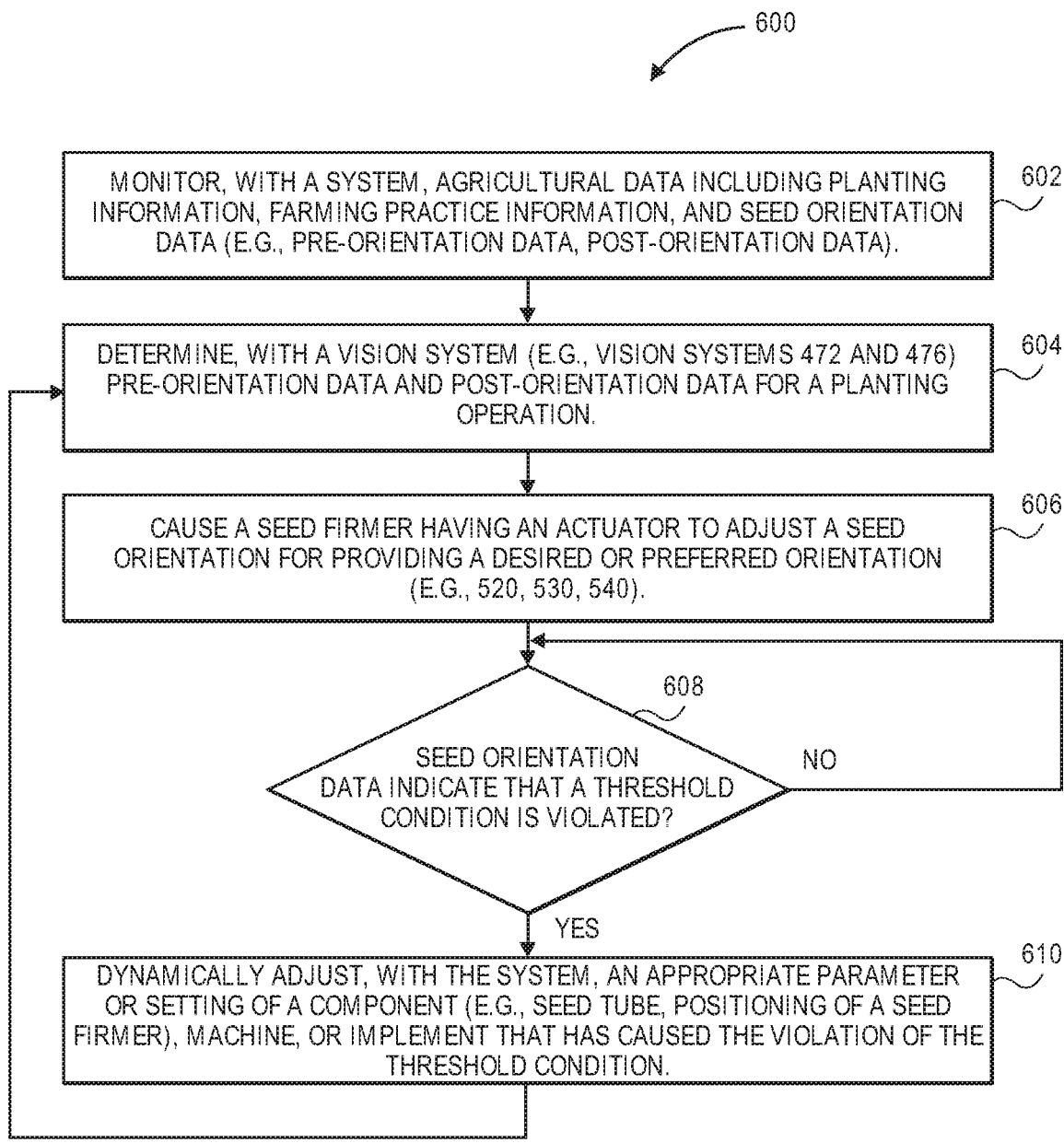
FIG. 6 illustrates a flow diagram of one embodiment for a method 600 of providing a preferred seed orientation during planting for field operations.

FIG. 6 illustrates a flow diagram of one embodiment for a method 600 of providing a preferred seed orientation during planting for field operations. The method 600 is performed by processing logic that may comprise hardware (circuitry, dedicated logic, etc.), software (such as is run on a general purpose computer system or a dedicated machine or a device), or a combination of both. In one embodiment, the method 600 is performed by processing logic of at least one data processing system (e.g., system 102, machine, implement, row unit, user device, etc). The system or device executes instructions of a software application or program with processing logic. The software application or program can be initiated by a system or may notify an operator or user of a machine (e.g., tractor, planter, combine) depending on whether seed orientation needs to be changed.

At block 602, a system monitors agricultural data including planting information, farming practice information, and seed orientation data (e.g., pre-orientation data, post-orientation data). A vision system (e.g., vision systems 472 and 476) optionally determines pre-orientation data and post-orientation data for a planting operation at block 604. At block 606, the system (or device) causes a seed firmer having a non-planar lower member to adjust a seed orientation for providing a desired or preferred orientation (e.g., 520, 530, 540). The adjustment may be at least partially based on the pre-orientation data during a training period. In one example, seed orientation data is obtained during an initial region of planting operations in a field for a training period. This seed orientation data for the initial region is then used to adjust the seed orientation to optimize seed orientation for subsequent regions of the field. At block 608, the system dynamically determines whether the seed orientation data indicates that a threshold condition (e.g., threshold condition for range of orientations at pre-orientation position, threshold condition for range of orientations at post-orientation position) has been violated. If so, then the system dynamically adjusts an appropriate parameter or setting of a component (e.g., seed tube, positioning of a seed firmer), machine, or implement that has caused the violation of the threshold condition at block 610. The method 600 can then return to block 604 to continue determining pre-orientation data and post-orientation data for a planting operation. If no violation occurs at block 608, the method continues to monitor seed orientation data to determine if the threshold condition has been violated at block 608.

FIG. 7A illustrates a side view of a firmer having a lower member with a non-planar design for orienting seeds in a desired or preferred orientation in accordance with one embodiment. In one example, the seed firmer 700 is designed to orient seeds with an orientation 520 as illustrated in FIG. 5. The seed firmer 700 includes a lower member 710 having a length 716 that is positioned within a trench to orient and position seed in the trench during planting.

FIG. 7B illustrates a cross-sectional view AA of a first region 711 of a lower member 710 in accordance with one embodiment. A first frontal region 711 of the lower member 710 includes a major axis 724 and a minor axis 726.

FIG. 7C illustrates a cross-sectional view BB of a second intermediate region 712 of the lower member 710 in accordance with one embodiment. The second region 712 of the lower member 710 includes a major axis 744 and a minor axis 746. The non-planar design of the lower member 710 causes the seeds to be oriented with a desired orientation (e.g., orientation 520) within a trench.

FIG. 7D illustrates a cross-sectional view CC of a third rear region 713 of the lower member 710 in accordance with one embodiment. The third region 713 of the lower member 710 includes a major axis 764 and a minor axis 766. The design of the third region 713 of the lower member 710 causes the seeds to be positioned within the trench with a desired depth and a desired orientation (e.g., orientation 520). In one example, the lower member 710 forces the seeds to stand up with the tip facing down into the soil and the embryo facing either the left or right wall of the trench, i.e., orientation 520.

In one embodiment, the non-planar ground contacting lower surface 714 of the lower member 710 comprises a first frontal region 711 that has a first non-planar (e.g., beveled, chamfered) feature near a first wall of a trench. The non-planar ground contacting lower surface 714 comprises a second intermediate region 712 that has a second different non-planar (e.g., beveled, chamfered) feature near the first wall of the trench. The non-planar ground contacting lower surface 714 comprises a third rear region 713 that has a planar feature between the first wall and a second opposing wall of the trench.

Figure 8:
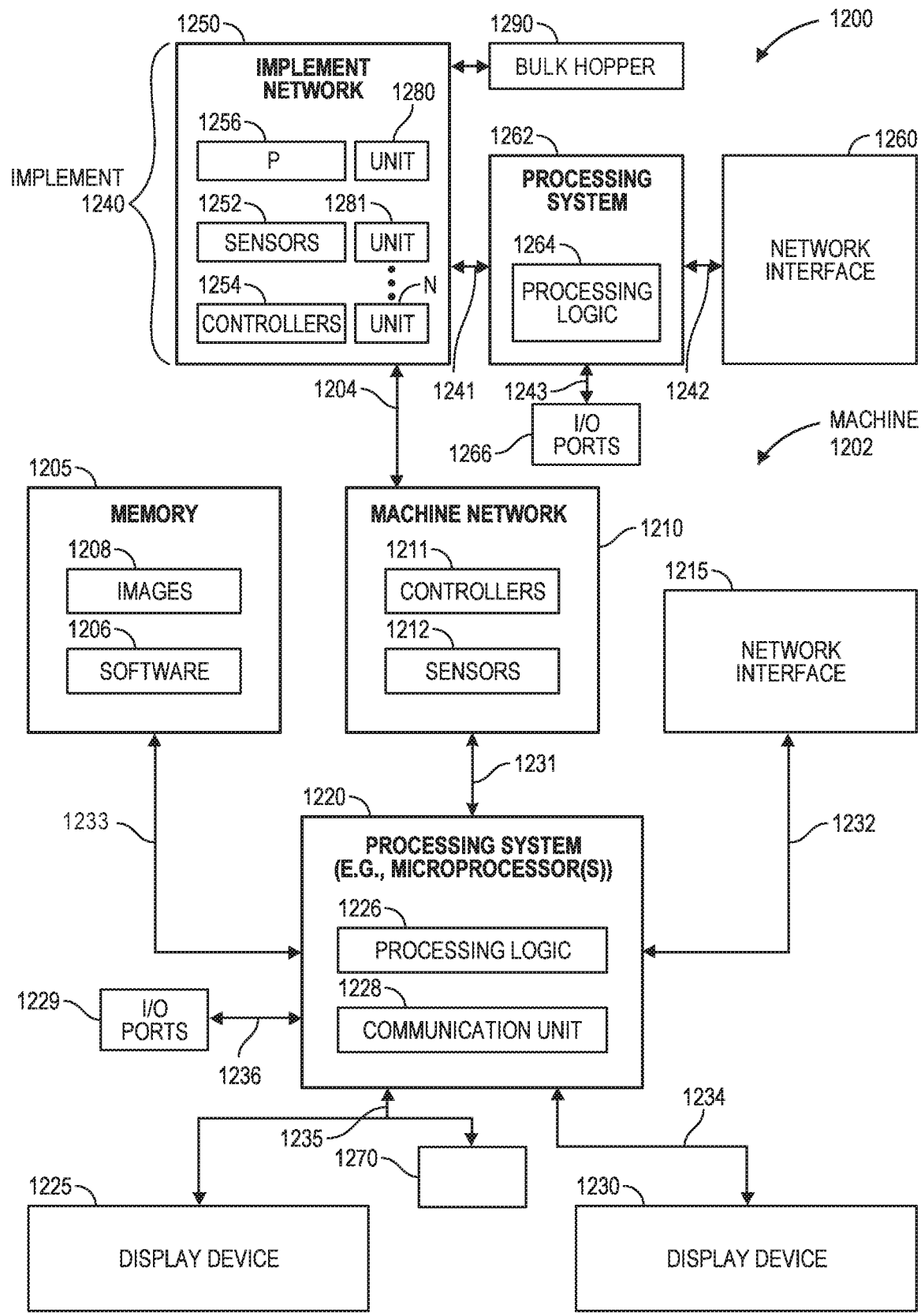
FIG. 8 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment.

FIG. 8 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 12. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for planting operations of a field. The seed orientation data for each row unit of the implement can be associated with locational data at time of planting to have a better understanding of the seed orientation for each row and region of a field. Data associated with the planting can be displayed on at least one of the display devices 1225 and 1230.

The processing system 1220 may include one or more microprocessors, processors, a system on a chip (integrated circuit), or one or more microcontrollers.

The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors may process the communications received from the communication unit 1228 including agricultural data (e.g., GPS data, liquid application data, flow rates, etc.). The system 1200 includes memory 1205 for storing data and programs for execution (software 1206) by the processing system. The memory 1205 can store, for example, software components such as planting software for analysis of planting and seed orientation for performing operations of the present disclosure, or any other software application or module, images (e.g., captured images of crops), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, cab control module 1270, display device 1230, display device 1225, and I/O ports 1229 via communication links 1231-1236, respectively.

Display devices 1225 and 1230 can provide visual user interfaces for a user or operator. The display devices may include display controllers. In one embodiment, the display device 1225 is a portable tablet device or computing device with a touchscreen that displays data (e.g., planting data, seed orientation data, captured images, localized view map layer, high definition field maps of as-applied seed orientation data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied planting data including seed orientation data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g., a controller area network (CAN) serial bus protocol network, an ISOBUS network, etc.) is coupled to at least one bulk hopper 1290 with each bulk hopper containing a seed variety (e.g., a seed variety or a soybean variety). Each bulk hopper is preferably in fluid communication with an individual seed entrainer (not shown). Each seed entrainer is preferably mounted to a lower outlet of the associated bulk hopper. Each seed entrainer is preferably in fluid communication with a pneumatic pressure source P 1256 and configured to convey air-entrained seeds through a plurality of seed lines to the row units 1280, 1281, . . . N. The implement includes sensors 1252 (e.g., speed sensors, seed sensors for detecting passage of seed, downforce sensors, actuator valves, moisture sensors or flow sensors for a combine, speed sensors for the machine, seed force sensors for a planter, liquid application sensors for a sprayer, or vacuum, lift, lower sensors for an implement, flow sensors, etc.), controllers 1254 (e.g., GPS receiver, drive controller), and the processing system 1262 for controlling and monitoring operations of the implement. For example, the controllers may include processors in communication with a plurality of seed sensors. The processors are configured to process data (e.g., seed orientation data, seed sensor data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 12.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the networks interfaces 1215 and 1260. The implement may also by physically coupled to the machine for agricultural operations (e.g., planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to performs operations or methods of the present disclosure. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A seed firmer comprising:
a base support configured to engage a bottom of a trench for planting seed in the trench; and
a lower member integrated with the base support or coupled to the base support, the lower member having a non-planar ground contacting lower surface disposed on a side of the lower member configured to be adjacent to a first wall of the trench, wherein the lower surface is configured to adjust an orientation and a depth of the seed within the trench, the lower surface comprising:
a first frontal region that has a first non-planar feature configured to position the seed near the first wall of the trench;
a second intermediate region that has a second different non-planar feature configured to position the seed near the first wall of the trench; and
a third rear region that has a planar feature between the first wall and a second opposing wall of the trench.

2. The seed firmer of claim 1, wherein the non-planar ground contacting lower surface is configured such that if the seed comprises seeds having tips, the non-planar ground contacting lower surface in configured to position the tips of the seeds in a downward direction into soil of the trench and embryos of the seeds in a first direction that is transverse with respect to a second direction of a row orientation for a row of plants.

3. The seed firmer of claim 1, wherein the non-planar ground contacting lower surface comprises at least one ridge, groove, or geometrical shape configured to adjust the orientation of the seed during planting.

4. A seed firmer comprising:
a base support configured to engage a bottom of a trench for planting seed in the trench;
a lower member integrated with the base support or coupled to the base support, the lower member having a non-planar ground contacting lower surface disposed on a side of the lower member configured to be adjacent to a first wall of the trench, wherein the lower surface is configured to adjust an orientation and a depth of the seed within the trench;
a first seed vision system configured to detect an orientation of the seed within the trench before the seed firmer passes the seed; and
a second vision system configured to detect the orientation of the seed within the trench after the seed firmer passes the seed.

5. The seed firmer of claim 1, further comprising at least one mechanical actuator configured to adjust the orientation of the seed during planting.

6. A seed firmer comprising:
a base support configured to engage a bottom of a trench for planting seed in the trench; and
a lower member integrated with the base support or coupled to the base support, the lower member having a non-planar ground contacting lower surface disposed on a side of the lower member configured to be adjacent to a first wall of the trench, wherein the lower surface is configured to adjust an orientation and a depth of the seed within the trench;
wherein the lower member has a first width at a first frontal region, a second width at a second intermediate region, and a third width at a third rear region, wherein the second width is greater than the first width and the third width is greater than the second width.

* * * * *